(12) United States Patent
Simard et al.

(10) Patent No.: US 12,540,176 B2
(45) Date of Patent: Feb. 3, 2026

(54) TRUE HUMAN ANTIBODY SPECIFIC FOR INTERLEUKIN 1 ALPHA

(71) Applicant: XBIOTECH INC., Vancouver (CA)

(72) Inventors: John Simard, Austin, TX (US); Sushma Shivaswamy, Austin, TX (US); Galina Kuzmicheva, Austin, TX (US)

(73) Assignee: XBIOTECH INC., Vancouver (CA)

( * ) Notice: Subject to any disclaimer, the term of this patent is extended or adjusted under 35 U.S.C. 154(b) by 494 days.

(21) Appl. No.: 18/295,193

(22) Filed: Apr. 3, 2023

(65) Prior Publication Data

US 2023/0322915 A1    Oct. 12, 2023

Related U.S. Application Data

(63) Continuation of application No. PCT/CA2021/051380, filed on Oct. 4, 2021.

(30) Foreign Application Priority Data

Oct. 7, 2020   (CA) ..................... 3095675

(51) Int. Cl.
    *C07K 16/24*    (2006.01)

(52) U.S. Cl.
    CPC ........ *C07K 16/245* (2013.01); *C07K 2317/21* (2013.01)

(58) Field of Classification Search
    CPC ............. C07K 16/245; C07K 2317/21; C07K 2317/56; C07K 2317/565; C07K 2317/92; C07K 2317/70; A61K 2039/505
    USPC .................................................... 424/142.1
    See application file for complete search history.

(56) References Cited

U.S. PATENT DOCUMENTS

| | | | |
|---|---|---|---|
| 4,634,664 A | 1/1987 | Oestberg | |
| 4,965,198 A | 10/1990 | Yamasaki et al. | |
| 5,034,316 A | 7/1991 | Weisbart et al. | |
| 5,168,062 A | 12/1992 | Stinski | |
| 5,231,024 A | 7/1993 | Moeller et al. | |
| 5,585,089 A | 12/1996 | Queen et al. | |
| 5,654,407 A | 8/1997 | Boyle et al. | |
| 5,693,762 A | 12/1997 | Queen et al. | |
| 5,792,838 A | 8/1998 | Smith et al. | |
| 5,795,967 A | 8/1998 | Aggarwal et al. | |
| 5,932,188 A | 8/1999 | Snow et al. | |
| 5,959,085 A | 9/1999 | Garonne et al. | |
| 6,090,382 A | 7/2000 | Salfeld et al. | |
| 6,140,470 A | 10/2000 | Garen et al. | |
| 6,623,736 B2 | 9/2003 | Tobinick | |
| 7,718,674 B2 | 5/2010 | Aberg | |
| 8,398,966 B2 | 3/2013 | Wu | |
| 2003/0026806 A1 | 2/2003 | Witte et al. | |
| 2003/0040617 A9 | 2/2003 | Rosen et al. | |
| 2003/0175832 A1 | 9/2003 | Marton | |
| 2003/0232054 A1 | 12/2003 | Tang et al. | |
| 2004/0097712 A1 | 5/2004 | Varnum | |
| 2004/0185514 A1 | 9/2004 | Frostegard | |
| 2005/0054019 A1 | 3/2005 | Michaud et al. | |
| 2005/0147603 A1 | 7/2005 | Smith et al. | |
| 2005/0276807 A1 | 12/2005 | Skurkovich | |
| 2006/0127407 A1 | 6/2006 | Chen | |
| 2006/0159775 A1 | 7/2006 | McGrath | |
| 2007/0071675 A1 | 3/2007 | Wu et al. | |
| 2008/0050310 A1 | 2/2008 | Ebens, Jr. et al. | |
| 2009/0123415 A1 | 5/2009 | Simard | |
| 2009/0191149 A1 | 7/2009 | Simard | |
| 2009/0215992 A1 | 8/2009 | Wu | |
| 2009/0258070 A1 | 10/2009 | Burnier | |
| 2009/0291081 A1 | 11/2009 | Hsieh | |
| 2009/0298096 A1 | 12/2009 | Simard | |
| 2010/0040574 A1 | 2/2010 | Simard | |
| 2010/0047239 A1 | 2/2010 | Wu | |
| 2010/0068212 A1 | 3/2010 | Simard | |
| 2010/0221179 A1 | 9/2010 | Hsieh | |
| 2011/0008282 A1 | 1/2011 | Simard | |
| 2011/0142761 A1 | 6/2011 | Wu | |
| 2011/0311547 A1 | 12/2011 | Simard | |
| 2012/0015384 A1 | 1/2012 | Simard | |
| 2012/0045444 A1 | 2/2012 | Simard | |
| 2012/0231012 A1 | 9/2012 | Simard | |
| 2012/0251548 A1 | 10/2012 | Simard | |
| 2013/0039921 A1 | 2/2013 | Simard | |
| 2013/0078258 A1 | 3/2013 | Simard | |
| 2013/0195877 A1 | 8/2013 | Simard | |
| 2013/0280253 A1 | 10/2013 | Hsieh | |
| 2013/0287788 A1 | 10/2013 | Simard | |
| 2014/0086933 A1 | 3/2014 | Simard | |

FOREIGN PATENT DOCUMENTS

| AU | 2007202323 | 5/2007 |
|---|---|---|
| CA | 2426384 | 4/2003 |
| EP | 0267611 | 5/1993 |

(Continued)

OTHER PUBLICATIONS

Miossec, P.: "Anti-interleukin 1 alpha autoantibodies," Ann Rheum Dis, 2002, 61:577-579.

Fleischmann, Roy M., A phase II trial of lutikizumab, an anti-interleukin-1alpha/beta dual variable domain immunoglobulin, in knee osteoarthritis patients with synovitis, Arthritis & Rheumatology, Jul. 2019, vol. 71, No. 7:1056-1069.

Dinarello, Charles A.: "Modalities for reducing interleukin 1 activity in disease" TIPS, May 1993, vol. 14:155-159.

Garrone, P. et al.: "Generation and characterization of a human monoclonal autoantibody that acts as a high affinity interleukin-1alpha specific inhibitor," Molecular Immunology, 1996, vol. 33, No. 78:649-658.

Satoh, H. et al.: "Characterization of anti-IL-1alpha autoantibodies in the sera from healthy humans," Immunopharmacology, 1994, vol. 27:107-118.

(Continued)

*Primary Examiner* — Yan Xiao

(74) *Attorney, Agent, or Firm* — Stanley A. Kim

(57) ABSTRACT

Fully human monoclonal Abs includes (i) an antigen-binding variable region that exhibits very high binding affinity for IL-1α and (ii) a constant region that is effective at both activating the complement system though C1q binding and binding to several different Fc receptors.

2 Claims, 2 Drawing Sheets

Specification includes a Sequence Listing.

(56) References Cited

FOREIGN PATENT DOCUMENTS

| | | |
|---|---|---|
| EP | 0659766 | 6/1995 |
| JP | 2004285057 | 4/2004 |
| WO | 9524917 | 9/1995 |
| WO | 9635719 | 11/1996 |
| WO | 0233094 | 4/2002 |
| WO | 2004100987 | 11/2004 |
| WO | 2006001967 | 1/2006 |
| WO | 2007015128 | 2/2007 |
| WO | 2007039552 | 4/2007 |
| WO | 2007120828 | 10/2007 |
| WO | 2007132338 | 11/2007 |
| WO | 2007135546 | 11/2007 |
| WO | 9006371 | 9/2009 |
| WO | 2009148575 | 12/2009 |
| WO | 2010030979 | 3/2010 |
| WO | 2010087972 | 8/2010 |
| WO | 2011159976 | 12/2011 |
| WO | 2012027324 | 3/2012 |
| WO | 2012135812 | 3/2012 |
| WO | 2013043973 | 3/2013 |
| WO | 2014055541 | 4/2014 |
| WO | 2014055544 | 4/2014 |
| WO | 2020176738 | 9/2020 |
| WO | 2022073103 | 4/2022 |
| WO | 2022073104 | 4/2022 |
| WO | 2022073105 | 4/2022 |
| WO | 2022105817 | 5/2022 |

OTHER PUBLICATIONS

Saurat, Jean-Hilaire et al.: Anti-interleukin-1alpha autoantibodies in humans: Characterization, isotype distribution, and receptor-binding inhibition—Higher frequency in Schnitzler's syndrome (urticaria and macroglobulinemia), J. Allergy Clin. Immunol., Aug. 1991, vol. 88, No. 2:243-256.

Kasahara, T. et al.: "Preparation and characterization of polyclonal and monoclonal antibodies against human interleukin 1 alpha (IL 1 alpha)," The Journal of Immunology, Mar. 1987, vol. 138, No. 6:1804-1812.

Hong, David S. et al: "MABp1, a first-in-class true human antibody targeting interleukin-1alpha in refractory cancers: an open-label, phase 1 dose-escalation and expansion study," Lancet Oncol, 2014, vol. 15:656-66.

```
                           SEQUENCE LISTING

Sequence total quantity: 8
SEQ ID NO: 1           moltype = AA  length = 114
FEATURE                Location/Qualifiers
source                 1..114
                       mol_type = protein
                       organism = Homo sapiens
SEQUENCE: 1
DIVMTQSPDS LAVSLGERAT INCKSSQSVL YSSNNKNYLA WYQQKPGQPP KLLIYWASTR   60
ESGVPDRFSG SGSGTDFTLT ISSLQAEDVA VYYCQQYYSS PPTFGGGTKV EIKR         114

SEQ ID NO: 2           moltype = AA  length = 118
FEATURE                Location/Qualifiers
source                 1..118
                       mol_type = protein
                       organism = Homo sapiens
SEQUENCE: 2
QVQLVQSGAE VKKPGSSVKV SCKASGGRFT NYAILWVRQA PGQGLQWLGG IIPIFDETDH   60
AQDFQDRLTI TVDESMTTAY MELSSLRPED TAIYYCATGS NSYYGLYWGQ GTLVTVSS    118

SEQ ID NO: 3           moltype = AA  length = 12
FEATURE                Location/Qualifiers
source                 1..12
                       mol_type = protein
                       organism = Homo sapiens
SEQUENCE: 3
QSVLYSSNNK NY                                                       12

SEQ ID NO: 4           moltype =    length =
SEQUENCE: 4
000

SEQ ID NO: 5           moltype = AA  length = 9
FEATURE                Location/Qualifiers
source                 1..9
                       mol_type = protein
                       organism = Homo sapiens
SEQUENCE: 5
QQYYSSPPT                                                            9

SEQ ID NO: 6           moltype = AA  length = 8
FEATURE                Location/Qualifiers
source                 1..8
                       mol_type = protein
                       organism = Homo sapiens
SEQUENCE: 6
GGRFTNYA                                                             8

SEQ ID NO: 7           moltype = AA  length = 8
FEATURE                Location/Qualifiers
source                 1..8
                       mol_type = protein
                       organism = Homo sapiens
SEQUENCE: 7
IIPIFDET                                                             8
```

```
SEQ ID NO: 8           moltype = AA  length = 11
FEATURE                Location/Qualifiers
source                 1..11
                       mol_type = protein
                       organism = Homo sapiens
SEQUENCE: 8
ATGSNSYYGL Y                                                               11
```

TRUE HUMAN ANTIBODY SPECIFIC FOR INTERLEUKIN 1 ALPHA

CROSS-REFERENCE TO RELATED APPLICATIONS

This application is a by-pass continuation under 35 U.S.C. 111 (a) of international patent application number PCT/CA2021/051380 filed Oct. 4, 2021, which claims priority to Canadian Patent Application number 3,095,675, filed Oct. 7, 2020, the entire contents of which are hereby incorporated by reference.

STATEMENT AS TO FEDERALLY SPONSORED RESEARCH

Not applicable.

SEQUENCE LISTING

The instant application contains a Sequence Listing which has been submitted electronically in XML format and is hereby incorporated by reference in its entirety. Said XML copy, created on Mar. 24, 2023, is named 5407-0410_SL.xml and is 7,248 bytes in size.

FIELD OF THE INVENTION

The invention relates generally to the fields of immunology and antibodies (Abs).

BACKGROUND

Interleukin 1 alpha (IL-1α) is a pro-inflammatory cytokine that plays a role in a number of different activities including inflammation, immune responses, tumor metastasis, and hematopoiesis. IgG autoantibodies against IL-1α occur naturally in the general human population and are thought to be beneficial in a number of different diseases which involve sterile inflammation.

SUMMARY

The amino acid sequence encoding the light and heavy chain variable region of a monoclonal Ab (mAb) that binds human IL-1α with high affinity was discovered. Accordingly, described herein are purified human mAbs including an antigen-binding variable region that (i) exhibits very high binding affinity for human IL-1α and (ii) comprises a light chain variable region including the amino acid sequence of SEQ ID NO:1 (or the CDRs thereof) and a heavy chain variable region including the amino acid sequence of SEQ ID NO:2 (or the CDRs thereof).

Also described herein is a set of isolated nucleic acids including a first nucleic acid encoding the heavy chain of a human mAb that specifically binds to IL-1α, and a second nucleic acid encoding the light chain of the human mAb that specifically binds to human IL-1α. The first nucleic acid can encode the amino acid sequence of SEQ ID NO: 1 (or the CDRs thereof) and the second nucleic acid can encode the amino acid sequence of SEQ ID NO: 2 (or the CDRs thereof).

In another aspect, described herein are expression vectors which include both a nucleic acid encoding the amino acid sequence of SEQ ID NO: 1 (or the CDRs thereof) and a nucleic acid encoding the amino acid sequence of SEQ ID NO:2 (or the CDRs thereof). Also described herein are a set of expression vectors including a first expression vector encoding the amino acid sequence of SEQ ID NO:1 (or the CDRs thereof) and a second expression vector encoding the amino acid sequence of SEQ ID NO:2 (or the CDRs thereof).

Additionally described herein is an isolated host cell (e.g. a mammalian cell such as a CHO cell) including a nucleic acid encoding the amino acid sequence of SEQ ID NO:1 (or the CDRs thereof) and a nucleic acid encoding the amino acid sequence of SEQ ID NO:2 (or the CDRs thereof).

Unless otherwise defined, all technical terms used herein have the same meaning as commonly understood by one of ordinary skill in the art to which this invention belongs. Commonly understood definitions of biological terms can be found in Rieger et al., Glossary of Genetics: Classical and Molecular, 5th edition, Springer-Verlag: New York, 1991; and Lewin, Genes V, Oxford University Press: New York, 1994.

As used herein, the word "a" or "an" before a noun represents one or more of the particular noun. For example, the phrase "an antibody" represents "one or more antibodies."

By the term "antibody" or "Ab" is meant any immunoglobulin (e.g., human, rodent, cartilaginous fish, or camelid antibodies) or conjugate thereof, that specifically binds to an antigen (e.g., human IL-1α). A wide variety of Abs are known by those skilled in the art. Non-limiting examples of Abs include: monoclonal Abs (e.g., including full-length Abs), polyclonal Abs, multi-specific Abs (e.g., bi-specific Abs), single-chain Abs (e.g., single-domain Abs, camelid Abs, and cartilaginous fish Abs), chimeric (e.g., humanized) Abs, and fully human Abs including those that can be found or induced in human beings (i.e., true human Abs). The term antibody also includes Ab conjugates (e.g., an Ab conjugated to a stabilizing protein, a label, or a therapeutic agent (e.g., any of the therapeutic agents described herein or known in the art)).

By the term "antigen-binding fragment" is meant any portion of a full-length Ab that contains at least one variable domain [e.g., a variable domain of a mammalian (e.g., human, mouse, rat, rabbit, or goat) heavy or light chain immunoglobulin, a camelid variable antigen-binding domain (VHH), or a cartilaginous fish immunoglobulin new antigen receptor (Ig-NAR) domain] that is capable of specifically binding to an antigen. For example, an antigen-binding fragment described herein can include at least part of an Ab Fc region that is sufficient to mediate antibody-dependent cell-mediated cytotoxicity (ADCC) and/or complement-dependent cytotoxicity (CDC) in a mammal (e.g., a human) and/or is conjugated to a therapeutic agent (e.g., any of the therapeutic agents described herein or known in the art). As another example, an antigen-binding fragment described herein can include at least part of an Ab Fc region that does not mediate ADCC and/or CDC in a mammal (e.g., a human). Non-limiting examples of Ab fragments include Fab, Fab', F(ab')2, Fv fragments, diabodies, linear antibodies, and multi-specific Ab formed from Ab fragments. Additional Ab fragments containing at least one camelid VHH domain or at least one cartilaginous fish Ig-NAR domain include mini-bodies, micro-antibodies, sub-nano-antibodies, and nano-antibodies, and any of the other forms of Abs described in U.S. Patent Application Publication No. 2010/0092470.

By the term "human antibody" is meant an Ab that is encoded by a nucleic acid (e.g., rearranged human immunoglobulin heavy or light chain locus) present in the genome of a human. In some embodiments, a human Ab is produced in a mammalian (e.g., human) cell culture (e.g., a Chinese hamster ovary cell line). In some embodiments, a human Ab is produced in a non-human cell (e.g., a mouse or hamster cell line). In some embodiments, a human Ab is produced in a bacterial or yeast cell.

By the term "single-chain antibody" is meant a single polypeptide that contains at least one variable binding domain) that is capable of specifically binding to an antigen. Non-limiting examples of single-chain Abs are described herein, and are known in the art (see, for example, the antibodies described in U.S. Patent Publication No. 2010/0092470).

An Ab or antigen-binding fragment thereof "specifically binds" or "binds specifically" to a particular antigen, e.g., human IL-1α (via the epitope of a full-length antibody including the light and heavy chain variable regions described herein binds), when it binds to that antigen, but recognizes and binds to a lesser extent (e.g., does not recognize and bind) to other molecules in a sample. In some embodiments, an Ab or an antigen-binding fragment thereof selectively binds to an epitope with an affinity (KD) equal to or less than $1\times10^{-10}$ M (e.g., less than $1\times10^{-11}$ M or less than $1\times10^{-12}$ M) in phosphate buffered saline (e.g., as determined by surface plasmon resonance). The ability of an Ab or antigen-binding fragment to specifically bind a protein epitope may be determined using any of the methods known in the art or those methods described herein.

By the term "complementary determining region" or "CDR" is meant a region within an Ig (heavy or light chain Ig) that forms part of an antigen-binding site in an Ab or antigen-binding fragment thereof. As is known in the art, a heavy chain Ig contains three CDRs: CDR1, CDR2, and CDR3, respectively, and a light chain Ig contains three CDRs: CDR1, CDR2, and CDR3. In any Ab or antigen-binding fragment thereof, the three CDRs from the heavy chain Ig and the three CDRs from the light chain Ig together form an antigen-binding site in the Ab or antigen-binding fragment thereof. The Kabat Database is one system used in the art to number CDR sequences present in a light chain Ig or a heavy chain Ig.

Although methods and materials similar or equivalent to those described herein can be used in the practice or testing of the present invention, suitable methods and materials are described below. All applications and publications mentioned herein are incorporated by reference in their entirety. In the case of conflict, the present specification, including definitions will control. In addition, the particular embodiments discussed below are illustrative only and not intended to be limiting.

BRIEF DESCRIPTION OF THE DRAWINGS

Embodiments of the present disclosure will now be described, by way of example only, with reference to the attached Figures.

DETAILED DESCRIPTION

Figure 1:
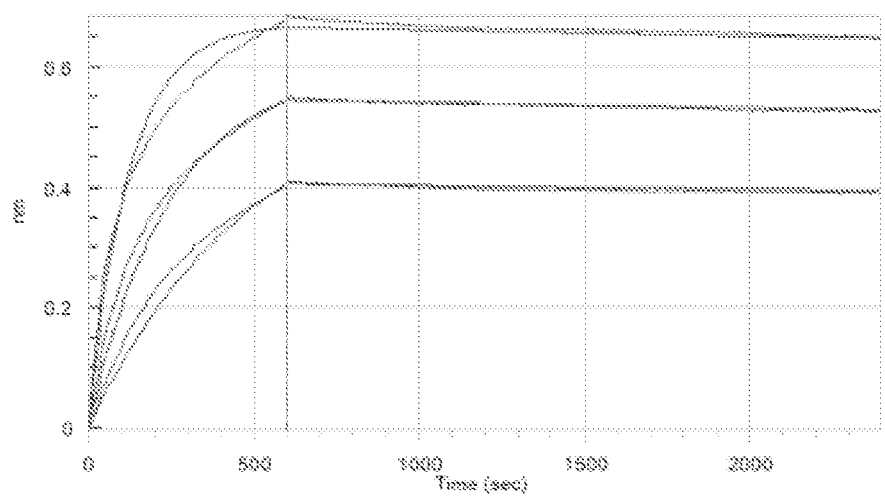
FIG. 1 is a graph showing the results of an Octet Red 96 assay indicated that the binding affinity (KD) for IL-1α of XIA11 was $7.02\times10^{-11}$.

Described herein are compositions and methods relating to fully (true) human mAbs that include an antigen-binding variable region that exhibits very high binding affinity for IL-1α. The below described preferred embodiments illustrate adaptation of these compositions and methods. Nonetheless, from the description of these embodiments, other aspects of the invention can be made and/or practiced based on the description provided below.

Methods involving conventional immunological and molecular biological techniques are described herein. Immunological methods (for example, assays for detection and localization of antigen-Ab complexes, immunoprecipitation, immunoblotting, and the like) are generally known in the art and described in methodology treatises such as Current Protocols in Immunology, Coligan et al., ed., John Wiley & Sons, New York. Techniques of molecular biology are described in detail in treatises such as Molecular Cloning: A Laboratory Manual, 2nd ed., vol. 1-3, Sambrook et al., ed., Cold Spring Harbor Laboratory Press, Cold Spring Harbor, N.Y., 2001; and Current Protocols in Molecular Biology, Ausubel et al., ed., Greene Publishing and Wiley-Interscience, New York. Ab methods are described in Handbook of Therapeutic Abs, Dubel, S., ed., Wiley-VCH, 2007. Cell culture techniques are generally known in the art and are described in detail in methodology treatises such as Culture of Animal Cells: A Manual of Basic Technique, 4th edition, by R Ian Freshney, Wiley-Liss, Hoboken, N.J., 2000; and General Techniques of Cell Culture, by Maureen A Harrison and Ian F Rae, Cambridge University Press, Cambridge, UK, 1994. Methods of protein purification are discussed in Guide to Protein Purification: Methods in Enzymology, Vol. 182, Deutscher M P, ed., Academic Press, San Diego, Calif., 1990.

A fully human mAb includes an antigen-binding variable region that (i) exhibits very high binding affinity for human IL-1α and (ii) comprises a light chain variable region including the amino acid sequence of SEQ ID NO:1 (or the CDRs thereof) and a heavy chain variable region including the amino acid sequence of SEQ ID NO:2 (or the CDRs thereof). The light and heavy chain variable regions (which together form the Fab) described herein can be joined to an Fc or portion thereof using conventional molecular biology techniques to fuse the desired Fc portion to the Fab or antigen-binding fragment. In this way, full-length immunoglobulins such as human IgG1 (e.g., IgG1a or IgG1b), IgG2 (e.g., IgG2a or IgG2b), IgG3 (e.g., IgG3a or IgG3b), IgG4 (e.g., IgG4a or IgG4b), IgD, IgA (e.g., IgA1, and IgA2), IgE, or IgM (e.g., dimeric, pentameric, and hexameric) (and the different allotypes of the foregoing) incorporating the light and heavy chain variable regions described herein can be made.

The mAb described herein might be affinity matured to enhance or otherwise alter their binding specificity by known methods such as VH and VL domain shuffling (Marks et al. Bio/Technology 10:779-783, 1992), random mutagenesis of the hypervariable regions (HVRs) and/or framework residues (Barbas et al. Proc Nat. Acad. Sci. USA 91:3809-3813, 1994; Schier et al. Gene 169:147-155, 1995; Yelton et al. J. Immunol. 155:1994-2004, 1995; Jackson et al., J. Immunol. 154 (7): 3310-9, 1995; and Hawkins et al, J. Mol. Biol. 226:889-896, 1992. Amino acid sequence variants of an Ab may be prepared by introducing appropriate changes into the nucleotide sequence encoding the Ab. In addition, modifications to nucleic acid sequences encoding mAbs might be altered (e.g., without changing the amino acid sequence of the mAb) for enhancing production of the mAb in certain expression systems (e.g., intron elimination and/or codon optimization for a given expression system). The mAbs described herein can also be modified by conjugation to another protein (e.g., another mAb) or non-protein molecule. For example, a mAb might be conjugated to a water-soluble polymer such as polyethylene glycol or a carbon nanotube (See, e.g., Kam et al., Proc. Natl. Acad. Sci. USA 102:11600-11605, 2005). See, U.S. patent application Ser. No. 11/754,899.

Amino acid mutations may be introduced into the constant region of these IgG subclasses. Amino acid mutations that can be introduced may be, for example, those that enhance binding to FcK receptors (as described in, e.g., Proc. Natl. Acad. Sci. U.S.A. 103 (11): 4005-4010, 2006; MAbs 1 (6): 572-579, 2009; US 2010/0196362; US 2013/0108623; US 2014/0171623; US 2014/0093496; and US 2014/0093959), or enhance or decrease binding to FcRn (as described in, e.g., J. Biol. Chem. 276 (9): 6591-6604, 2001; Int Immunol. 18 (12): 1759-1769, 2006; and J. Biol. Chem. 281 (33): 23514-23524, 2006).

Two types of H chains are heterologously associated to produce a bispecific Ab. The knobs-into-holes technology (as described in, e.g., *J. Immunol. Methods* 248 (1-2): 7-15, 2001; and *J. Biol. Chem.* 285 (27): 20850-20859, 2010), the electrostatic repulsion technology (as described in, e.g., WO 06/106955), the SEEDbody technology (as described in, e.g., *Protein Eng. Des. Sel.* 23 (4): 195-202, 2010), and such may be used for heterologous association of two types of H chains via a CH3 domain. Any of the Abs described herein may be those with a modified or deficient sugar chain. Examples of Abs having modified sugar chains include glycosylation-engineered antibodies (as described in, e.g., WO 99/54342), Abs with defucosylated sugar chains (as described in, e.g., WO 00/61739, WO 02/31140, WO 06/067847, and WO 06/067913), and Abs having a sugar chain with bisecting GlcNAc (as described in, e.g., WO 02/79255). Known examples of methods for producing sugar chain-deficient IgG antibodies include the method of introducing a mutation to asparagine at EU numbering position 297 in the heavy chain (*J. Clin. Pharmacol.* 50 (5): 494-506, 2010), and the method of producing IgG using *E. coli* (*J. Immunol. Methods* 263 (1-2): 133-147, 2002; and *J. Biol. Chem.* 285 (27): 20850-20859, 2010). Furthermore, heterogeneity accompanying deletion of C-terminal lysine in IgG, and heterogeneity accompanying mispairing of disulfide bonds in the hinge region of IgG2 can be decreased by introducing amino acid deletions/substitutions (as described in, e.g., WO 09/041613). Any of the Abs or antigen-binding fragments described herein includes at least one (e.g., one, two, three, four, five, or six) amino acids (e.g., an added, inserted, or substituted amino acid, e.g., not within a CDR) that are not present in a corresponding human Ab. Any of the Abs or antigen-binding fragments described herein can also have at least one amino acid deleted (e.g., as compared to a corresponding human Ab), e.g., a deletion from the N- or C-terminus of a light or heavy chain, or a deletion of an amino acid from a constant domain (e.g., Fc domain).

Preferably, to ensure that high titers of the human IL-1α-specific mAb can be administered to a subject with minimal adverse effects, the mAb compositions of the invention are at least 0.5, 1, 2, 3, 4, 5, 6, 7, 8, 9, 10, 11, 12, 13, 14, 15, 20, 25, 30, 35, 40, 45, 50, 60, 70, 80, 90, 95, 96, 97, 98, 99, 99.9 or more percent by weight pure (excluding any excipients). The mAb compositions of the invention might include only a single type of mAb (i.e., one produced from a single clonal B lymphocyte line). In addition to the human IL-1α mAb, the Ab compositions of the invention might also include other mAbs that specifically bind antigens other than human IL-1α.

To modify or enhance its function, the mAb might be conjugated with another molecule such as a cytotoxin or detectable label. A human IL-1α-specific mAb might be conjugated with one or more cytotoxins to more effectively kill cells expressing IL-1α. Cytotoxins for use in the invention can be any cytotoxic agent (e.g., molecule that can kill a cell after contacting the cell) that can be conjugated to a human IL-1α specific mAb. Examples of cytotoxins include, without limitation, radionuclides (e.g., $^{35}S$, $^{14}C$, $^{32}P$, $^{125}I$, $^{131}I$, $^{90}Y$, $^{89}Zr$, $^{201}Tl$, $^{186}Re$, $^{188}Re$, $^{57}Cu$, $^{213}Bi$, and $^{211}At$), conjugated radionuclides, and chemotherapeutic agents. Further examples of cytotoxins include, but are not limited to, antimetabolites (e.g., 5-fluorouricil (5-FU), methotrexate (MTX), fludarabine, etc.), anti-microtubule agents (e.g., vincristine, vinblastine, colchicine, taxanes (such as paclitaxel and docetaxel), etc.), alkylating agents (e.g., cyclophosphamide, melphalan, bischloroethylnitrosurea (BCNU), etc.), platinum agents (e.g., cisplatin (also termed cDDP), carboplatin, oxaliplatin, JM-216, CI-973, etc.), anthracyclines (e.g., doxorubicin, daunorubicin, etc.), antibiotic agents (e.g., mitomycin-C), topoisomerase inhibitors (e.g., etoposide, teniposide, and camptothecins), or other cytotoxic agents such as ricin, diphtheria toxin (DT), *Pseudomonas* exotoxin (PE) A, PE40, abrin, saporin, pokeweed viral protein, ethidium bromide, glucocorticoid, anthrax toxin and others. See, e.g., U.S. Pat. No. 5,932,188.

The human IL-1α specific mAb can also be conjugated to a detectable label. Useful detectable labels in the present invention include biotin or streptavidin, magnetic beads, fluorescent dyes (e.g., fluorescein isothiocyanate, Texas red, rhodamine, green fluorescent protein, and the like), radiolabels (e.g., $^{3}H$, $^{125}I$, $^{35}S$, $^{14}C$, $^{32}P$, $^{111}In$, $^{97}Ru$, $^{67}Ga$, $^{68}Ga$, or $^{72}As$), radiopaque substances such as metals for radioimaging, paramagnetic agents for magnetic resonance imaging, enzymes (e.g., horseradish peroxidase, alkaline phosphatase and others commonly used in an ELISA), and colorimetric labels such as colloidal gold or colored glass or plastic (e.g., polystyrene, polypropylene, latex, etc.) beads. Means of detecting such labels are well known to those of skill in the art. Thus, for example, radiolabels may be detected using photographic film or scintillation counters. Fluorescent markers may also be used and can be detected using a photodetector to detect emitted illumination. Enzymatic labels are typically detected by providing the enzyme with a substrate and detecting the reaction product produced by the action of the enzyme on the substrate, and colorimetric labels are detected by simply visualizing the colored label.

The present invention also encompasses nucleic acid molecules encoding the mAb specific for human IL-1α. Although the same nucleic acid molecule might encode both the heavy and light chains of a human IL-1α-specific mAb, a set of two different nucleic acid molecules, one encoding the heavy chain and the other encoding the light chain might also be used. Any other suitable nucleic acid that encodes the amino acid sequences of the mAb described herein might also be used.

For production of mAbs, the nucleic acid molecules encoding the heavy and light chains might be incorporated into an expression vector in an orientation wherein such nucleic acid molecules are operatively linked to expression control sequences such as transcriptional and translational control sequences. Examples of expression vectors include vectors derived from plasmids and vectors derived from viruses such as adenoviruses, adeno-associated viruses, and retroviruses. The nucleic acid molecules encoding a light chain and a heavy chain might be incorporated into a single vector or different vectors. The vectors of the invention might also include regulatory sequences such as promoters and/or enhancers (see, U.S. Pat. Nos. 5,168,062, 4,510,245 and 4,968,615), selectable markers, or sequences encoding affinity tags (for facilitating purification) or a detectable label.

For production of mAbs, the vectors of the invention can be introduced into a suitable host cell, e.g., a prokaryotic cell such as a bacteria or, preferably, a eukaryotic cell such as mammalian, plant, or yeast host cell. Examples of methods for introducing heterologous polynucleotides into host cells include use of viral vectors, electroporation, encapsulation of the polynucleotide(s) in liposomes, dextran-mediated transfection, calcium phosphate precipitation, polybrene-mediated transfection, protoplast fusion, *Agrobacterium*-mediated transformation, biolistic transformation, and direct microinjection of the DNA into nuclei. Mammalian cell lines are presently preferred for expression of mAbs from vectors. Examples of mammalian host cells include Chinese hamster ovary (CHO) cells (e.g., the DG44 CHO cell line or the CHO-K1 cell line), Hela cells, baby hamster kidney (BHK) cells, African green monkey kidney cells (COS), human hepatocellular carcinoma cells (e.g., Hep G2), NS0 cells, SP2 cells, HEK-293T cells, 293 Freestyle cells, and NIH-3T3 cells. The mAb might also be expressed in transgenic animals or plants. See, e.g., U.S. Pat. Nos. 5,827,690; 5,756,687; 5,750,172; 5,741,957; 6,046,037; and 5,959,177.

The Abs and antigen-binding fragments described herein can be formulated as pharmaceutical compositions which contain the Abs and antigen-binding fragment and at least one pharmaceutically acceptable carrier (e.g., a non-natural pharmaceutically acceptable carrier). Non-limiting examples of pharmaceutically acceptable carriers include sterilized water, physiological saline, stabilizers, excipients, antioxidants (e.g., ascorbic acid), buffers (e.g., phosphate, citrate, histidine, and other organic acids), antiseptics, surfactants (e.g., PEG and Tween), chelating agents (e.g., EDTA or EGTA), and binders. Additional examples of pharmaceutically acceptable carriers also include low-molecular-weight polypeptides, proteins (e.g., serum albumin and gelatin), amino acids (e.g., glycine, glutamine, asparagine, glutamic acid, aspartic acid, methionine, arginine, and lysine), sugars and carbohydrates (e.g., polysaccharides and monosaccharides), and sugar alcohols (e.g., mannitol and sorbitol). When preparing an aqueous solution for injection, physiological saline and isotonic solutions comprising glucose and other adjuvants such as D-sorbitol, D-mannose, D-mannitol, and sodium chloride may be used, and if necessary, in combination with appropriate solubilizers, such as alcohol (e.g., ethanol), polyalcohols (e.g., propylene glycol and PEG), and nonionic surfactants (e.g., polysorbate 80, polysorbate 20, poloxamer 188, and HCO-50). By mixing hyaluronidase into the formulation, a larger fluid volume can be administered subcutaneously (see, e.g., *Expert. Opin. Drug. Deliv.* 4 (4): 427-440, 2007).

The Abs and antigen-binding fragments provided herein may, e.g., be encapsulated in microcapsules (e.g., those made of hydroxymethylcellulose, gelatin, and poly(methylmetacrylate)), or incorporated as components of colloidal drug delivery systems (e.g., liposomes, albumin microspheres, microemulsion, nanoparticles, and nanocapsules) (see, for example, "Remington's Pharmaceutical Science 16th edition", Oslo Ed. (1980)). Methods for preparing the pharmaceutical compositions as controlled-release pharmaceutical agents are also well-known, and such methods may be applied to the Abs and antigen-binding fragments of the present invention (see, e.g., Langer et al., *J. Biomed. Mater. Res.* 15:267-277, 1981; Langer, Chemtech. 12:98-105, 1982; U.S. Pat. No. 3,773,919; European Patent Application Publication No. EP 58,481; Sidman et al., *Biopolymers* 22:547-556, 1983; and EP 133,988).

The pharmaceutical compositions provided herein can be formulated for intravenous, intraarterial, intradermally, subcutaneous, intramuscular, intraperitoneal, or oral administration.

Examples

Example 1—Discovery of the Heavy and Light Chain Variable Region Sequences of an Anti-Human IL-1α Ab Plasma and peripheral blood mononuclear cells (PBMC) were isolated from a healthy human donor. The presence of anti-IL-1α antibodies in the plasma was confirmed by bead-based flow cytometric analysis using streptavidin magnetic beads that were conjugated with biotinylated recombinant human IL-1α. PBMCs were isolated from the donor's blood using Histopaque™ 1077 and Accuspin™ tubes, and cells were isolated from a portion of the PBMCs. RNA was extracted from the PBMCs as well as the B cells using conventional methods, and cDNA was prepared from the RNA. PCRs were performed on the cDNA using the procedure and primers described in U.S. Pat. No. 9,453,217. The reverse primer used was selected to specifically amplify IgG4 and IgG1 as the reactivities in the plasma were isotyped to be predominantly of IgG4 subclass, with some signal from IgG1 subclass. Both kappa and lambda light chain libraries were made. Phage libraries were generated from IgG4-kappa overlaps and three rounds of panning were performed without any phage amplification in between the rounds. The input library diversity was found to be 0.65e12. After round 2, half of the clones were counted on a plate, and the remainder were subjected to an additional round of panning. After three rounds of panning, 38 clones remained. An ELISA-based screening was performed with the phage supernatants on ELISA plates coated with recombinant human IL-1α, with anti-FLAG antibody for detection of bound phages, and positive clones were identified. One of these-designated XIA11—was selected and sequenced. The amino acid sequence of the variable regions of the light and heavy chains of the human monoclonal antibody designated XIA11 is as follows with the CDRs (determined by IMGT/DomainGapAlign; Ehrenmann, F., Lefranc, M.-P. Cold Spring Harb Protoc., 2011 (6): 737-749 (2011). DOI: 10.1101/pdb.prot5636. PMID: 21632775.) shown in bold and underlining:

>XIA11_Light Chain
DIVMTQSPDSLAVSLGERATINCK-
  SSQSVLYSSNNKNYLAWYQQKPGQPPKLLIY
  WASTRESGVPDRESGSGSGTDFTLTISSLQAE-
  DVAVYYCQQYYSSPPTFGGGTKV EIKR [SEQ ID NO:1]

>XIA11_Heavy Chain
QVQLVQSGAEVKKPGSSVKVSCKASG-
  GRFTNYAILWVRQAPGQGLQWLGGIIPI FDETD-
  HAQDFQDRLTITVDESMTTAYMELSSLRPED-
  TAIYYCATGSNSYYGLYW GQGTLVTVSS [SEQ ID NO:2]

The XIA11 light chain thus has a CDR1 having the amino acid sequence QSVLYSSNNKNY [SEQ ID NO:3], a CDR2 having the amino acid sequence WAS, and a CDR3 having the amino acid sequence QQYYSSPPT [SEQ ID NO:5]. Similarly, the XIA11 heavy chain thus has a CDR1 having the amino acid sequence GGRFTNYA [SEQ ID NO: 6], a CDR2 having the amino acid sequence IIPIFDET [SEQ ID NO:7], and a CDR3 having the amino acid sequence ATG-SNSYYGLY [SEQ ID NO:8].

Example 2—Characterization of XIA11

Figure 2:
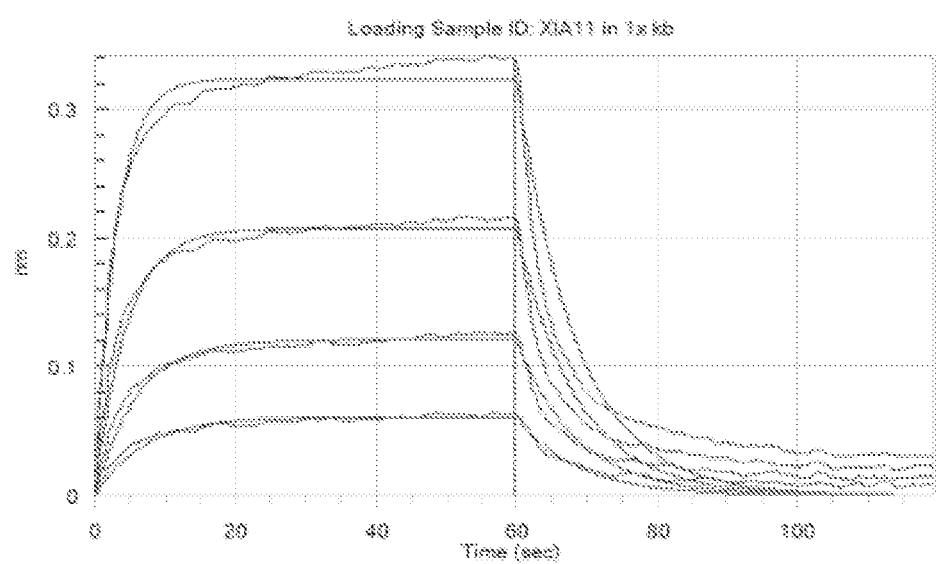
FIG. 2 is a graph showing the results of an Octet Red 96 assay indicated that the binding affinity (KD) for the neonatal Fc receptor (FcRn) of XIA11 was $2.10\times10^{-7}$.

The results of an Octet Red 96 assay indicated that the binding affinity (KD) for IL-1a of XIA11 was $7.02 \times 10^{-11}$ (see FIG. 1). The results of an Octet Red 96 assay indicated that the binding affinity (KD) for the neonatal Fc receptor (FcRn) of XIA11 was $2.10 \times 10^{-7}$ (see FIG. 2).

A HUVEC-based potency assay indicated that XIA11 $IC_{50}$ was 3.4 ng/ml. Briefly, $0.2 \times 10^6$ HUVEC cells (Corning™ 354151)/ml were seeded in 96 well flat bottom plate. XIA11 molecule was diluted to concentrations ranging from 610 pg/ml to 100 pg/ml. Diluted XIA11 was dosed to HUVEC cells in the 96 well plate at final concentration ranges from 61 pg/ml to 10 µg/ml. 0.5 ng/ml hIL-1α was applied to each well in the 96 well plate and the assay plate was incubated at 37° C./5% $CO_2$ for 18 hrs. HUVEC cells were stained with anti-ICAM-1 antibody (eBioscience 12-0549, clone HA58) and expression level of ICAM-1 was determined using flow cytometry. Data analysis was performed with FlowJo and IC 50 was calculated using KaleidaGraph.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A pharmaceutical composition comprising a purified human monoclonal antibody that specifically binds to interleukin 1 alpha (IL-1α), and comprises a light chain variable region amino acid sequence comprising a CDR having the amino acid sequence of SEQ ID NO: 3, a CDR having the amino acid sequence WAS, and a CDR having the amino acid sequence of SEQ ID NO:5, and a heavy chain variable region amino acid sequence comprising a CDR having the amino acid sequence of SEQ ID NO:6, a CDR having the amino acid sequence of SEQ ID NO:7, and a CDR having the amino acid sequence of SEQ ID NO:8.

2. The pharmaceutical composition of claim 1, wherein the light chain variable region has the amino acid sequence of SEQ ID NO:1, and the heavy chain variable region has the amino acid sequence of SEQ ID NO:2.

* * * * *